US012560196B2

(12) United States Patent
Jeong

(10) Patent No.: US 12,560,196 B2
(45) Date of Patent: Feb. 24, 2026

(54) BALL JOINT AND VEHICLE HAVING THE SAME

(71) Applicants: HYUNDAI MOTOR COMPANY, Seoul (KR); KIA CORPORATION, Seoul (KR)

(72) Inventor: Seong Hee Jeong, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 448 days.

(21) Appl. No.: 18/113,837

(22) Filed: Feb. 24, 2023

(65) Prior Publication Data

US 2024/0166005 A1 May 23, 2024

(30) Foreign Application Priority Data

Nov. 21, 2022 (KR) ........................ 10-2022-0156508

(51) Int. Cl.
*F16C 11/06* (2006.01)
*B60G 7/00* (2006.01)
(52) U.S. Cl.
CPC .......... *F16C 11/0642* (2013.01); *B60G 7/005* (2013.01); *B60G 2204/11* (2013.01); *B60G 2400/05162* (2013.01)
(58) Field of Classification Search
CPC .............. F16C 11/0642; F16C 11/0647; F16C 11/06–086; Y10T 403/20;
(Continued)

(56) References Cited

U.S. PATENT DOCUMENTS 4,679,957 A * 7/1987 Bauer ................. F16C 11/0619
                                                              403/115
4,986,689 A * 1/1991 Drutchas ............... F16C 11/106
                                                              403/135
(Continued)

FOREIGN PATENT DOCUMENTS

DE            10110738 C5      6/2008
DE       102005030971 B4      1/2016
(Continued)

OTHER PUBLICATIONS

"Diffuse Photoelectric Sensors". Niu Feng. Zhejiang Hugong Automation Technology Co. Ltd.. Sep. 13, 2021, [online], [retreived on Jul. 11, 2025]. Retreived from the Internet <URL:https://www.omchsmps.com/diffuse-photoelectric-sensors/?gclid=EAlalQobChMlwPu5t4qs3AIVAQAAABOBAAAAEAAYACAAEgJVzfD_BwE/>.*

Primary Examiner — Amber R Anderson
Assistant Examiner — Kevin J Baynes
(74) Attorney, Agent, or Firm — Morgan, Lewis & Bockius LLP

(57) ABSTRACT

A ball joint configured for detecting movement of a ball stud with a simple configuration, determining stability and behavior of a vehicle, and determining the presence or absence of abnormalities in parts, and a vehicle including the same, may include: a ball stud including a spherical head and a rod integrally formed with the head; a bearing formed in a shape of a tube open to first and second sides thereof and at least partially surrounding the head; a case formed in a shape of a tube open to first and second sides thereof and at least partially surrounding an external side of the bearing; a cap assembled in the case to close an opening on the first side of the case; and an optical sensor mounted on the cap facing the head.

7 Claims, 6 Drawing Sheets

(58) Field of Classification Search
CPC ..... Y10T 403/32196; Y10T 403/32311; B60G
7/005; B60G 2204/11; B60G 2204/416
See application file for complete search history.

(56) References Cited

U.S. PATENT DOCUMENTS

| | | | | |
|---|---|---|---|---|
| 5,319,577 A * | 6/1994 | Lee | ..................... | B25J 17/0283 |
| | | | | 700/259 |
| 6,533,491 B1 * | 3/2003 | Redele | ............... | F16C 11/0647 |
| | | | | 403/138 |
| 6,879,240 B2 | 4/2005 | Kruse | | |
| 7,048,461 B2 * | 5/2006 | Williams | ............ | F16C 11/0647 |
| | | | | 403/135 |
| 7,063,480 B2 * | 6/2006 | Ersoy | ................... | B60G 17/019 |
| | | | | 403/135 |
| 7,170,285 B2 * | 1/2007 | Spratte | ................... | G01D 5/145 |
| | | | | 324/207.21 |
| 7,171,330 B2 * | 1/2007 | Kruse | ................... | G01D 5/344 |
| | | | | 702/151 |
| 7,367,742 B2 * | 5/2008 | Brunneke | ........... | F16C 11/0647 |
| | | | | 403/135 |
| 7,405,557 B2 * | 7/2008 | Spratte | ................... | B60G 7/005 |
| | | | | 324/261 |
| 7,762,736 B2 * | 7/2010 | Ersoy | ....................... | B60D 1/30 |
| | | | | 403/132 |
| 7,841,799 B2 * | 11/2010 | Spratte | ............... | F16C 11/0642 |
| | | | | 403/130 |
| 7,926,826 B2 * | 4/2011 | Hayakawa | ............ | B62D 7/163 |
| | | | | 280/93.5 |
| 8,342,560 B2 * | 1/2013 | Albers | ................... | B60D 1/065 |
| | | | | 280/511 |
| 10,119,894 B2 * | 11/2018 | Holmes | ............... | F16C 11/0647 |
| 11,788,828 B1 * | 10/2023 | Peterson | ............. | B62D 15/023 |
| | | | | 33/203.18 |
| 11,859,658 B2 * | 1/2024 | Kerner | ................ | F16C 11/0609 |
| 2008/0193207 A1 * | 8/2008 | Kruse | ................ | F16C 11/0647 |
| | | | | 700/13 |
| 2008/0199247 A1 * | 8/2008 | Spratte | ................... | F16C 41/00 |
| | | | | 403/27 |
| 2008/0315867 A1 * | 12/2008 | Spratte | ............... | F16C 11/0647 |
| | | | | 324/207.13 |
| 2009/0087253 A1 | 4/2009 | Spratte et al. | | |
| 2009/0232590 A1 * | 9/2009 | Ersoy | ................. | F16C 11/0647 |
| | | | | 403/135 |
| 2011/0153157 A1 * | 6/2011 | Klank | ................... | B60G 7/005 |
| | | | | 701/37 |
| 2011/0204881 A1 * | 8/2011 | Spratte | ............... | F16C 11/0604 |
| | | | | 324/207.13 |
| 2018/0231051 A1 | 8/2018 | Klank et al. | | |
| 2022/0194466 A1 * | 6/2022 | Tonini | ................. | B62D 15/023 |
| 2023/0151847 A1 * | 5/2023 | Werries | ................. | G01D 11/30 |
| | | | | 403/27 |
| 2023/0220871 A1 * | 7/2023 | Berger | ............... | F16C 11/0657 |
| | | | | 403/135 |

FOREIGN PATENT DOCUMENTS

| | | | | |
|---|---|---|---|---|
| DE | 102016210406 A1 * | 12/2017 | ............. | G01D 5/145 |
| WO | 2017/067745 A1 | 4/2017 | | |
| WO | 2017/067766 A1 | 4/2017 | | |
| WO | WO-2017067742 A1 * | 4/2017 | ........... | F16C 17/246 |
| WO | WO-2018033322 A1 * | 2/2018 | ........... | F16C 41/007 |
| WO | WO-2019092209 A1 * | 5/2019 | ........... | A01B 59/008 |

* cited by examiner

BALL JOINT AND VEHICLE HAVING THE SAME

CROSS-REFERENCE TO RELATED APPLICATION(S)

The present application claims priority to Korean Patent Application No. 10-2022-0156508 filed on Nov. 21, 2022, the entire contents of which is incorporated herein for all purposes by this reference.

BACKGROUND OF THE PRESENT DISCLOSURE

Field of the Present Disclosure

The present disclosure relates to a ball joint capable of detecting movement of a ball stud with a simple configuration, determining stability and behavior of a vehicle and determining the presence or absence of abnormalities in parts, and a vehicle having the same.

Description of Related Art

For example, in a vehicle, a lower arm connected to a wheel is mounted on both sides of a vehicle body, and a ball joint is mounted at one end of the lower arm so that a rotatable knuckle may be connected by a tie rod. By the present ball joint, upward and downward movement and steering movement of the wheel may be performed.

An example of a ball joint is known from German patent DE 101 10 738 C5. This patent document discloses a ball joint in which a bar magnet is disposed on a ball portion and a magnetic field sensor is fixed to a plastic insertion portion of a housing. Accordingly, a ball joint provided with a pivot angle sensor system for obtaining a pivot angle of the ball joint may be provided.

However, the ball joint of the above-described patent document has disadvantages in that the configuration of the ball joint is significantly complicated and a manufacturing process thereof may be cumbersome and expensive. Furthermore, in the ball joint of the above-described patent document, it is impossible to measure and convert load applied to parts thereof while driving of the vehicle into data.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a ball joint configured for detecting movement of a ball stud with a simple configuration, determining stability and behavior of a vehicle, and determining the presence or absence of abnormalities in parts, and a vehicle having the same.

According to an aspect of the present disclosure, a ball joint may include: a ball stud including a spherical head and a rod integrally formed with the head; a bearing formed in a shape of a tube open to first and second sides thereof and at least partially surrounding the head; a case formed in a shape of a tube open to first and second sides thereof and at least partially surrounding an external side of the bearing; a cap assembled in the case to close an opening on the first side of the case; and an optical sensor mounted on the cap facing the head.

The head may include a flat surface formed on a side of the rod, and the optical sensor may emit light toward the head through an opening on one side of the bearing and receive the light reflected from the flat surface.

The optical sensor may include a light emitting portion emitting light and a light receiving portion receiving reflected the light reflected from the flat surface, and the light emitting portion and the light receiving portion may be eccentrically positioned with respect to a central axis of the case.

The cap may include a concave and flat center portion, and the optical sensor may be mounted on the center portion.

A stepped groove may be formed in the center portion of the cap, and the optical sensor may be accommodated in the stepped groove.

A vehicle according to an exemplary embodiment of the present disclosure may include the ball joint described above; and a control unit electrically connected to the ball joint.

The ball joint may be provided between a lower arm and a knuckle forming a suspension.

The optical sensor of the ball joint may detect at least one of a change amount in a height of the ball stud and an inclination direction of the ball stud and output the same to the control unit.

The control unit may be configured to determine a vehicle height, stability and behavior of the vehicle, or load applied to parts according to driving of the vehicle according to data detected by the optical sensor.

The control unit may be configured to determine that there is an abnormality in the ball joint or a part connected to the ball joint when the load is out of a predetermined threshold value.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
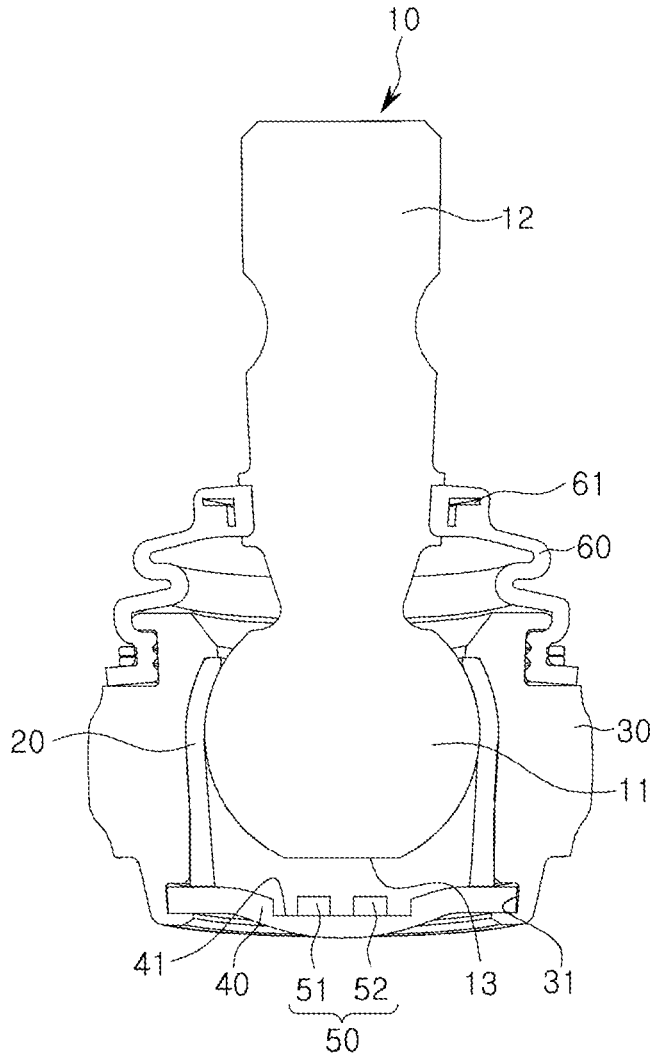
FIG. 1 is a cross-sectional view exemplarily illustrating a ball joint according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments in the present disclosure will be described with reference to the accompanying drawings. In adding reference numerals to the components of each drawing, it should be noted that the same components have the same numerals as much as possible even if they are displayed on different drawings.

Figure 2:
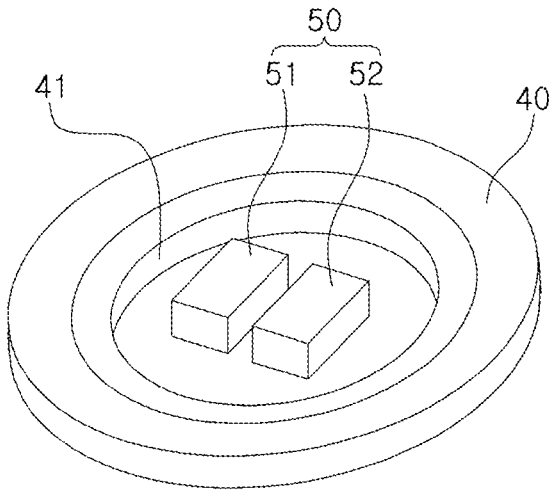
FIG. 2 is a perspective view of a cap provided with an optical sensor.

FIG. 1 is a cross-sectional view exemplarily illustrating a ball joint according to an exemplary embodiment of the present disclosure, and FIG. 2 is a perspective view of a cap on which an optical sensor is mounted.

A ball joint according to an exemplary embodiment of the present disclosure may include a ball stud 10, a bearing 20, a case 30, a cap 40, and an optical sensor 50.

The ball stud 10 may have a spherical head 11 formed at a lower end portion, and for example, a cylindrical rod 12 may be integrally formed with the head in an upper portion of the head. The head may include a flat surface 13 formed on an opposite side of the rod.

The flat surface 13 may extend in a direction orthogonal to an axial direction of the rod 12. Furthermore, because the head 11 has a spherical shape, the flat surface may be formed in a circular shape.

The bearing 20 may be formed in an open top and bottom cylindrical shape to be disposed to at least partially surround the head 11 of the ball stud 10. A lower end portion of the bearing may be supported by contacting with an upper surface of the cap 40.

The bearing 20 may be integrally formed of a material that has appropriate rigidity and exhibits elasticity, for example, plastic.

Furthermore, a diameter of an upper opening of the bearing 20 may be smaller than a diameter of a lower opening thereof. The rod 12 of the ball stud 10 may protrude from inside of the bearing through the upper opening of the bearing.

The case 30 may be formed in an open top and bottom cylindrical shape to be disposed to surround an external side of the bearing 20. The case may be formed to surround an entire external surface of the bearing while in contact with a same from an upper end portion to a lower end portion of the bearing.

However, an exemplary embodiment thereof is not necessarily limited thereto, and for example, the case 30 may be formed to surround an external side of the bearing 20 while partially in contact with the same.

A cap fixing portion 31 into which an end portion of the cap 40 is fitted may be formed around the lower opening of the case 30.

The cap 40 is a substantially plate-shaped member with a concave and flat center portion, and may be formed to be assembled to the cap fixing portion 31 of the case 30 to close the lower opening of the case 30. As a result, the cap has an advantage of facilitating the optical sensor 50 to be mounted in the case as well as facilitating maintenance of the ball joint.

Optionally, a more concave stepped groove 41 may be formed in a center portion of the cap 40. Because the optical sensor 50 is accommodated in the stepped groove, contact with or interference with the head 11 of the ball stud 10 may be prevented.

The ball joint according to an exemplary embodiment of the present disclosure may further include a dust cover 60 formed in an open top and bottom bell shape and provided to cover an external surface of the ball stud 10.

The dust cover 60 may be formed of an elastic material, and may include insert steel 61 inserted into upper and lower end portions of the dust cover in a circumferential direction to secure rigidity of the dust cover.

The lower end portion of the dust cover 60 and the upper end portion of the case 30 may be fixed to each other by the insert steel 61, and the upper end portion of the dust cover 60 and the rod 12 of the ball stud 10 may be fixed to each other. Accordingly, the dust cover may block moisture or foreign substances from entering the inside of the ball joint.

The optical sensor 50 may be mounted on a concave and flat center portion of an internal surface of the cap 40. Optionally, when the stepped groove 41 is formed in the center portion of the cap, the optical sensor may be accommodated and fixedly mounted in the stepped groove.

As a result, the optical sensor may be disposed so that a sensing surface always faces the head 11 of the ball stud 10, faces the flat surface 13 of the head, and contact or interference with the head 11 may be prevented.

The optical sensor 50 may be fixedly mounted on the internal surface of the cap 40 by, for example, adhesives, screws, or the like. However, an exemplary embodiment thereof is not necessarily limited thereto, and for example, the optical sensor may be mounted on the cap by forming a groove, recessed from the internal surface of the cap and inserting the optical sensor into the groove.

As the optical sensor 50, an optical sensor using laser light, infrared light, or the like, may be employed. The optical sensor may emit light toward the head 11 of the ball stud 10 through the lower opening of the bearing 20, and receive the reflected light from the head, so that a change in a distance between the head 11 and the cap 40, that is, a change amount in a height ($\Delta$h) and an inclination direction of the ball stud may be detected.

For example, when laser light is used, the frequency-modulated laser light reaches the flat surface 13 formed on the head 11 of the ball stud 10 and is reflected. A frequency displacement (this is referred to as the Doppler effect) is generated according to the movement of the flat surface.

By comparing the present frequency displacement with a standard frequency, a speed of the flat surface or head may be determined from the displacement difference. Furthermore, a distance may be determined by multiplying the determined speed by a time at which the laser light is emitted from the optical sensor 50 and reflected on the flat surface 13 to reach the optical sensor again.

To the present end, the optical sensor 50 may include a light emitting portion 51 emitting light and a light receiving portion 52 receiving reflected light.

A method of manufacturing a ball joint according to an exemplary embodiment of the present disclosure configured as described above will be described.

First, a ball stud 10, a bearing 20, and a case 30 are mounted together. After assembling the ball stud and bearing, the present assembly may be inserted into the case 30. Alternatively, after assembling the bearing and the case, the ball stud may be inserted into the bearing of the assembly.

Subsequently, the cap 40 to which the optical sensor 50, that is, the light emitting portion 51 and the light receiving portion 52 are mounted in advance, may be inserted into the cap fixing portion 31 of the case 30. Press fit and/or swaging processing may be applied to the assembling the cap and the case.

Next, the lower end portion of the dust cover 60 and the upper end portion of the case 30 are fixed by the insert steel 61, and similarly, the upper end portion of the dust cover and the rod 12 of the ball stud 10 are fixed by the insert steel.

Thus, the ball joint of the present disclosure may be completed together with the assembly of the dust cover.

Figure 3:
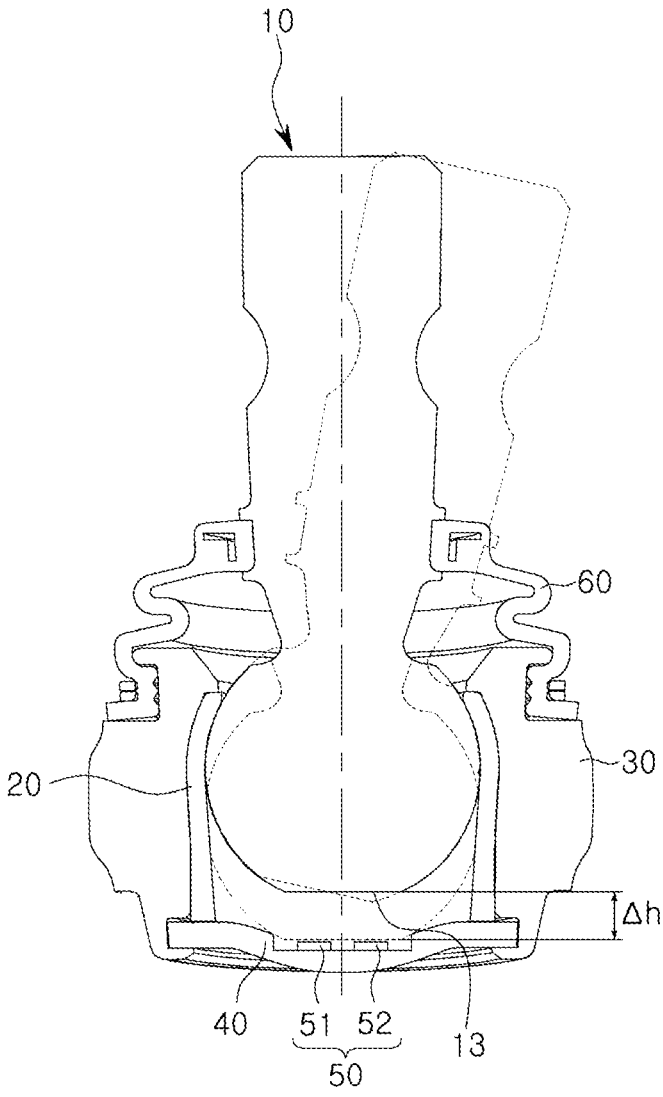
FIG. 3 is a view for illustrating an operation of a ball joint according to an exemplary embodiment of the present disclosure.
Figure 4:
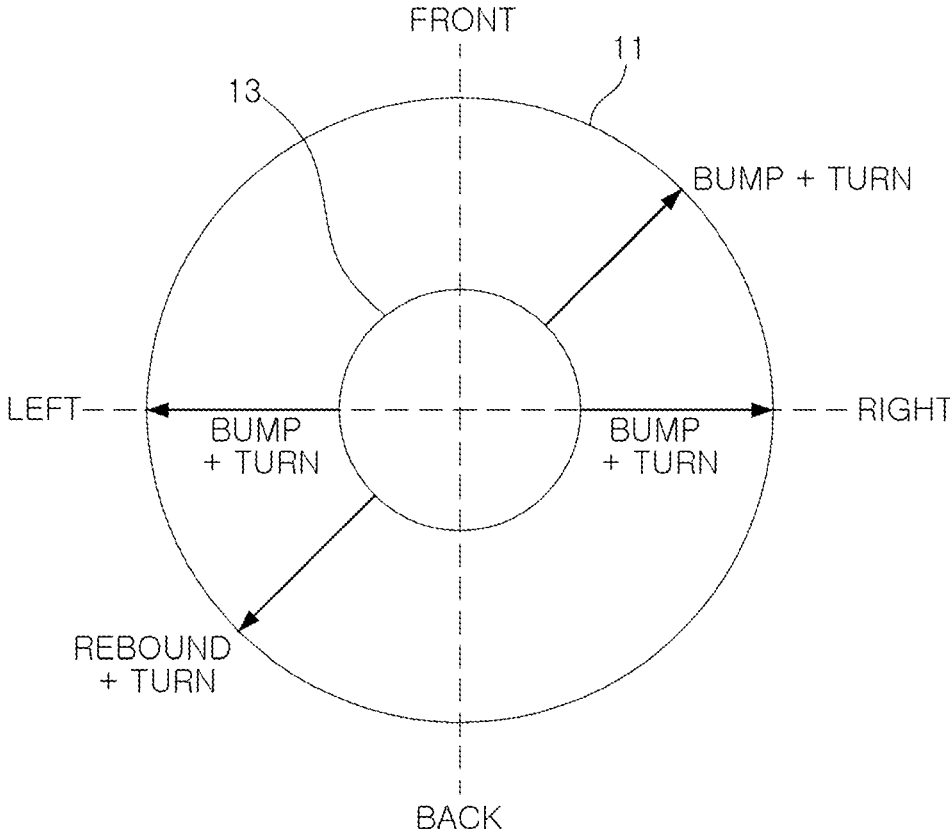
FIG. 4 is a diagram illustrating an example of detecting an inclination direction according to movement of the head in FIG. 3.

FIG. 3 is a diagram for illustrating an operation of a ball joint according to an exemplary embodiment of the present disclosure, and FIG. 4 is a diagram illustrating an example of an optical sensor detecting according to movement of the head in FIG. 3.

For example, by measuring a change in a distance between the head 11 and the cap 40 using a time at which the light emitted from a light emitting portion 51 of the optical sensor 50 is reflected from the flat surface 13 of the head 11 of the ball stud 10, and then returned to a light receiving portion 52, the optical sensor can detect a change amount in a height ($\Delta$h) of the ball stud.

Furthermore, when the ball stud 10 moves within the case 30, the ball stud may be inclined. When an angle between the ball stud and the case changes, an incident angle of emitted light and an output angle of reflected light are changed correspondingly together with the distance between the optical sensor 50 and the flat surface 13 of the head 11, and subsequently, the reflected light is incident on the light receiving portion 52 of the optical sensor, so that the intensity, area, or size of the reflected light collected on the surface of the light receiving portion is changed.

In response to such a change, the light receiving portion 52 generates different electrical signals, and thus the optical sensor 50 may detect a direction in which the ball stud 10 is inclined, that is, an inclination direction thereof.

The ball stud 10 may move within a predetermined movement range with respect to the case 30. For example, the ball stud may be inclined forwards and backwards and/or leftwards and rightwards by approximately ±25° with respect to the case, i.e., within a total of 50°. Here, the inclination, corresponding to 0° is a state in which the ball stud is at a center portion of a movement range thereof, that is, a state in which the flat surface 13 of the head 11 of the ball stud is orthogonal to a central axis of the case.

The optical sensor 50 may detect a distance between the optical sensor and the flat surface 13 on the head 11 of the ball stud when the inclination of the ball stud 10 with respect to the case 30 is 0°.

Because the light emitting portion 51 and the light receiving portion 52 of the optical sensor 50 are located eccentrically with respect to the central axis of the case 30, respectively, when the ball stud 10 pivots, a non-linear functional relationship is formed between the distance and the inclination, and the light emitting portion 51 and the light receiving portion 52 may detect to be inclined at a positive angle or a negative angle, over a specific movement range of the ball stud.

FIG. 4 is a view exemplarily illustrating movement of a head when viewed from below. For example, when a ball joint according to an exemplary embodiment of the present disclosure is mounted on a vehicle, when a flat surface 13 of a head 11 moves to either of leftward and rightward sides and is inclined with respect to a central axis of a case 30 and a ball stud 10 is inclined with respect to the case, it may be determined that the vehicle turns to one side of a traveling direction, and when the flat surface of the head in an opposite direction, it may be determined that the vehicle turns in an opposite direction to the traveling direction thereof.

Furthermore, for example, when the flat surface 13 of the head 11 moves forward while moving either of leftward and rightward sides, it may be determined that the vehicle turns together with a bump. When the flat surface of the head moves backward while moving either of leftward and rightward sides, it may be determined that the vehicle turns together with a rebound.

As described above, the ball joint according to an exemplary embodiment of the present disclosure may detect a change amount in a height ($\Delta$h) of the ball stud 10 and an inclination direction of the ball stud by the optical sensor 50 and use the same.

A ball joint according to an exemplary embodiment of the present disclosure may be mounted on a vehicle. For example, a lower arm forming a suspension of the vehicle may be connected to a knuckle through the ball joint of the present disclosure. By the present ball joint, upward and downward movement and steering movement of the wheel may be performed.

Figure 5:
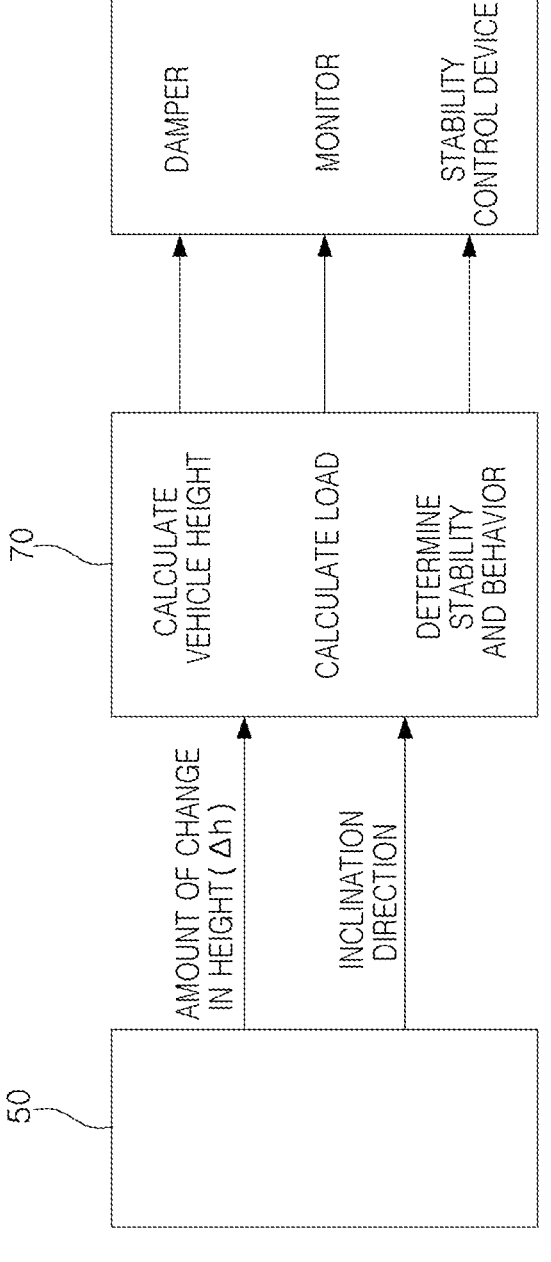
FIG. 5 is a schematic diagram illustrating a control relationship of a vehicle using a ball joint according to an exemplary embodiment of the present disclosure.

FIG. 5 is a schematic diagram illustrating a control relationship of a vehicle using a ball joint according to an exemplary embodiment of the present disclosure.

When the ball joint according to various exemplary embodiments of the present disclosure is mounted on a vehicle, the optical sensor 50 may be electrically connected to the control unit 70 of the vehicle. The optical sensor may detect and output at least one of a change amount in a height ($\Delta$h) of the ball stud 10 and an inclination direction of the ball stud to the control unit.

When a detection signal is input from the optical sensor 50, the control unit 70 may be configured to determine a vehicle height according to the detected data, determine stability and behavior of the vehicle, or determine a load applied to portions such as a ball joint, a lower arm connected thereof, or the like, according to driving of the vehicle.

The control unit 70 may be electrically connected to the optical sensor 50 of the ball joint through at least one of, for example, wired, wireless, and wired/wireless communication.

The control unit 70 may be implemented with a memory, a microprocessor, and the like. The memory may store data detected from the optical sensor 50. The microprocessor is configured to determine the vehicle height of the vehicle, stability and behavior, and load according to driving using the data stored in the memory, and control other driving elements of the vehicle.

Furthermore, the control unit 70 may be incorporated into, for example, an electronic control unit (ECU) of a vehicle or used in combination thereof. Alternatively, the control unit may be electrically connected to an upper control system of the vehicle to provide detected data.

For example, when the optical sensor 50 measures a change in a distance between a head 11 and a cap 40 to detect a change amount in a height (Δh) of the ball stud 10, the control unit may be configured to determine a vehicle height of the vehicle based on the detected change amount in a height and transmit a related control signal to a damper.

Moreover, when the optical sensor 50 measures the change in the distance between the head 11 and the cap 40 and detects the change amount in a height (Δh) of the ball stud 10, the control unit 70 may be configured to determine a load according to driving based on the detected amount of the change in height.

Figure 6:
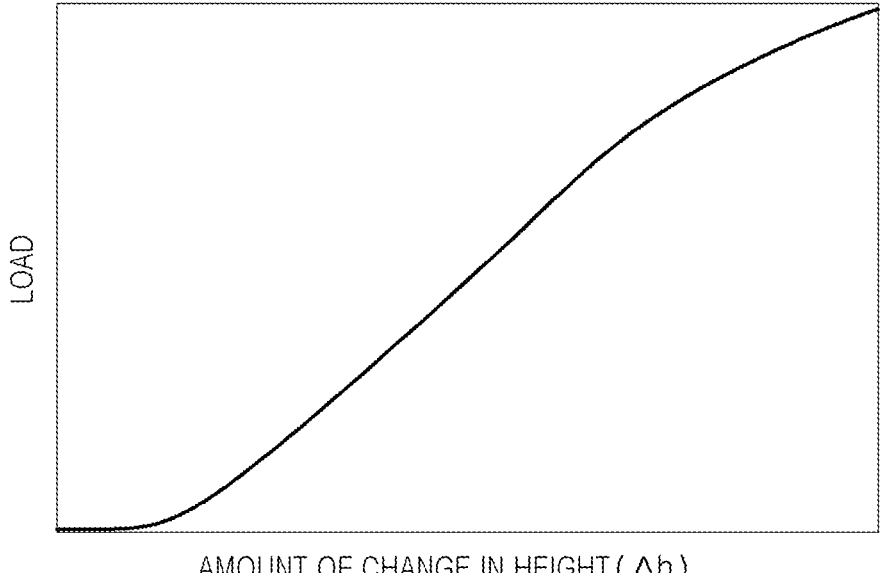
FIG. 6 is an example of a graph illustrating a relationship between load and an amount of the change in height.

FIG. 6 is an example of a graph illustrating a relationship between load and an amount of the change in height.

Through the illustrated graph or mathematical function, an applied load value corresponding to the detected change amount in a height (Δh) of the ball stud 10 may be obtained. The control unit 70 may store or monitor the data of the determined load, and if the load is out of a predetermined threshold value, it may be determined that there is an abnormality in a part such as a ball joint, a lower arm connected thereto, or the like. For example, the control unit may transmit abnormal information related to parts to a user through a monitor.

Meanwhile, when the optical sensor 50 detects an inclination direction of the ball stud 10, the control unit 70 may be configured to determine stability and behavior of the vehicle such as leftward and rightward turning, bump, rebound, and the like, of the vehicle, based on the detected inclination direction, and transmit a related control signal to a vehicle stability control device.

As described above, according to an exemplary embodiment of the present disclosure, by mounting a sensor inside a ball joint, data on the stability and behavior of the vehicle may be collected, and the presence or absence of abnormalities in parts such as the ball joint, a lower arm connected thereto, or the like, may be checked, so that an effect of helping to maintain the vehicle may be obtained.

While the example embodiments have been illustrated and described above, it will be apparent to those skilled in the art that modifications and variations could be made without departing from the scope of the present disclosure as defined by the appended claims.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A ball joint apparatus, comprising:

a ball stud including a spherical head and a rod integrally formed with the head;

a bearing formed in a shape of a tube open to first and second sides thereof and at least partially surrounding the head;

a case formed in a shape of a tube open to first and second sides thereof and at least partially surrounding an external side of the bearing;

a cap assembled in the case to close an opening on the first side of the case;

an optical sensor mounted on the cap facing the head; and a control unit electrically connected to the optical sensor, wherein the optical sensor of the ball joint apparatus is configured to detect at least one of a change amount in a height of the ball stud and an inclination direction of the ball stud and to output the at least one to the control unit, and wherein the control unit is configured to determine a height of a vehicle, or to determine stability and behavior of the vehicle according to data detected by the optical sensor.

2. The ball joint apparatus of claim 1, wherein the head includes a flat surface formed on a side opposite of the rod, and wherein the optical sensor is configured to emit light toward the flat surface of the head through an opening on the first side of the bearing, and to receive the light reflected from the flat surface.

3. The ball joint apparatus of claim 2, wherein the optical sensor includes a light emitting portion emitting the light toward the flat surface of the head, and a light receiving portion receiving the light reflected from the flat surface.

4. The ball joint apparatus of claim 3, wherein the light emitting portion and the light receiving portion are located eccentrically with respect to a central axis of the case.

5. The ball joint apparatus of claim 1, wherein the cap includes a concave and flat center portion, and wherein the optical sensor is mounted in the concave and flat center portion.

6. The ball joint apparatus of claim 5, wherein a stepped groove is formed in the concave and flat center portion of the cap, and wherein the optical sensor is accommodated in the stepped groove.

7. The ball joint apparatus of claim 1, wherein the control unit is further configured to determine that there is an abnormality in the ball joint apparatus or a part connected to the ball joint apparatus when a load applied to the part is out of a predetermined threshold value.

* * * * *